A. T. BALDWIN.
BINDING POST FOR ELECTRIC WIRES.
APPLICATION FILED JULY 18, 1919.

1,357,926.

Patented Nov. 2, 1920.

Inventor:
Allen T. Baldwin
by his Attorneys
Howson and Howson

UNITED STATES PATENT OFFICE.

ALLEN T. BALDWIN, OF ELIZABETH, NEW JERSEY, ASSIGNOR TO MANHATTAN ELECTRICAL SUPPLY COMPANY, INC., OF NEW YORK, N. Y., A CORPORATION OF MASSACHUSETTS.

BINDING-POST FOR ELECTRIC WIRES.

1,357,926.     Specification of Letters Patent.     Patented Nov. 2, 1920.

Application filed July 18, 1919. Serial No. 311,737.

*To all whom it may concern:*

Be it known that I, ALLEN T. BALDWIN, a citizen of the United States of America, residing in the city of Elizabeth, in the county of Union, in the State of New Jersey, have invented a new and useful Improvement in Binding-Posts for Electric Wires, of which the following is a description.

My invention relates to spring binding posts for electric wires and is especially designed for connecting up the bared ends of electric wires to battery poles and the like. The main object of my invention is to so construct the spring post that the introduction of the wire end into the gripping jaws may be facilitated, but so that when the wire end is in place, it will be firmly held.

In the accompanying drawings.

Figure 1:
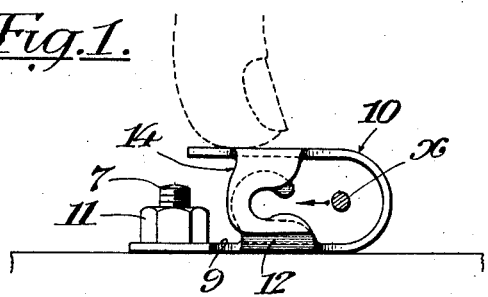
Figure 1 is a side elevation showing the manner of introducing the wire end.

In the form shown in the drawings, the binding post is stamped up out of spring sheet metal, the main part consisting of a body strip bent into U-form, approximately, and adapted to have one arm 9 of the U-bend attached to the pole piece or other part to which the post is to be mechanically and electrically connected, while the arm 10 of the post is left free. The end of the arm 9 may be provided with an opening 8, by which this end of the post may be slipped over the upper threaded end 7 of the pole piece of a battery electrode, for example, and securely fixed by being clamped in place by a nut 11.

The opposite edges of the fixed and free arms of the spring binding post are provided with coöperating pairs of open jaws or hooks to receive the wire end $x$. Thus the fixed arm 9 of the post has two flanges 12 and 13 at its opposite edges, preferably bent up from the same piece of metal of which the arms 9, 10 are formed and standing parallel to each other and at right angles to the plane of the arm 9. Each of these flanges 12, 13 is made into the form of a jaw or hook, with the open side of the hook preferably facing toward the return bend of the spring strip. The free spring arm 10 is similarly provided with a pair of parallel hook-shaped flanges 14, 15, with the open sides of the hooks also facing toward the return bend. These several hooked flanges 12, 13, 14 and 15 all lie in substantially parallel planes, and in the case illustrated, the flanges 14 and 15 on the arm 10 lie outside the flanges 12 and 13. The spring bend given to the strip is such that when there is no wire held in place therein, the free arm 10 will normally stand some distance outwardly, beyond the positions shown in Figs. 1 and 2.

Figure 2:
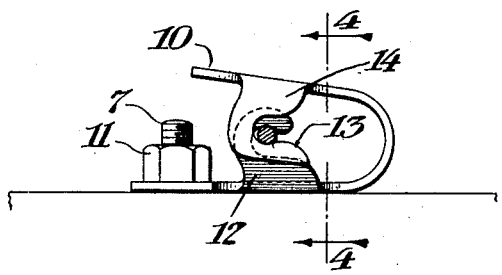
Fig. 2 is a similar view, showing the wire end gripped by the binding post.
Figure 3:
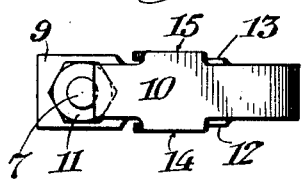
Fig. 3 is a plan view.
Figure 4:
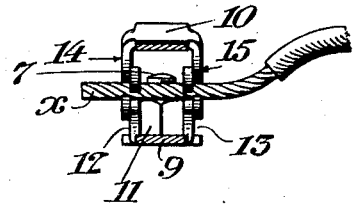
Fig. 4 is a transverse section on the line 4—4, Fig. 2.
Figure 5:
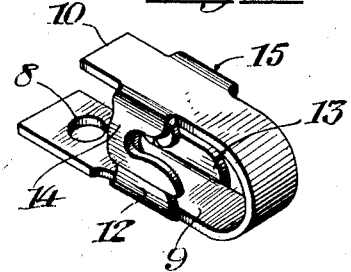
Fig. 5 is a perspective view.

When it is desired to insert a wire end in the binding post, pressure on the free arm 10, as by the finger, will cause the outer parts of the hooks on the opposite arms 10 and 9 to pass each other and present a laterally open space, as seen in Fig. 1, for the sidewise insertion of the wire end $x$ into the hooked jaws, as indicated by the arrow in Fig. 1. Then upon release of the pressure upon the arm 10, the wire end will be found tightly gripped between the sharp edges of the two pairs of jaws, as seen in Fig. 2.

This makes it easier to insert the wire than if these flanges 12, 13, 14 and 15 had closed holes for the endwise insertion of the wire end.

I claim as my invention:

1. A binding post comprising a single sheet of spring metal bent back upon itself, and having parallel flanges projecting upwardly from each side of the lowermost section, and other parallel flanges projecting downwardly from each side of the uppermost section, the flanges of one section being disposed externally of and adjacent the corresponding flanges of the other section, the flanges of both sections having coacting transverse recesses therein forming jaws for the lateral insertion of a wire, and the recesses of one section being adapted to be brought into register with the recesses of the other section against the tension of the spring metal to permit the insertion of the wire and to grip the said wire under the action of said spring metal when the latter is released.

2. A binding post comprising a single sheet of spring metal bent back upon itself, and having parallel flanges projecting upwardly from each side of the lowermost section, and other parallel flanges projecting downwardly from each side of the uppermost section the flanges of the uppermost section being disposed externally of and adjacent the corresponding flanges of the lowermost section, the flanges of both sections having coacting transverse recesses therein forming jaws for the lateral insertion of a wire, and the recesses of one section being adapted to be brought into register with the recesses of the other section against the tension of the spring metal to permit the insertion of the wire and to grip the said wire under the action of said spring metal when the latter is released.

3. A binding post comprising a single sheet of spring metal bent back upon itself, and having parallel flanges projecting upwardly from each side of the lowermost section, and other parallel flanges projecting downwardly from each side of the uppermost section, the flanges of one section being disposed externally of and adjacent the corresponding flanges of the other section, the flanges of both sections having coacting transverse recesses therein forming jaws for the lateral insertion of a wire, said recesses being faced in the direction of the bend in the spring metal, and the recesses of one section being adapted to be brought into register with the recesses of the other section against the tension of the spring metal to permit the insertion of the wire and to grip the said wire under the action of said spring metal when the latter is released.

In testimony whereof I have signed my name to this specification.

ALLEN T. BALDWIN.